United States Patent [19]

Chaiken

[11] Patent Number: 5,487,011
[45] Date of Patent: Jan. 23, 1996

[54] GARMENT MARKER SYSTEM HAVING COMPUTER ASSISTED ALIGNMENT OF VARIABLE CONTRAST CLOTH DESIGNS

[75] Inventor: Craig L. Chaiken, Spring, Tex.

[73] Assignee: Gerber Garment Technology, Inc., Tolland, Conn.

[21] Appl. No.: 210,303

[22] Filed: Mar. 17, 1994

[51] Int. Cl.$^6$ .......................... G06F 19/00; G05B 19/18; G06K 9/00; G01N 21/84

[52] U.S. Cl. ............... 364/470; 364/167.01; 364/474.09; 382/111; 356/429

[58] Field of Search ............... 364/470, 474.09, 364/474.13, 167.01; 83/76.8, 76.9, 734; 382/8, 22; 348/263; 358/101; 356/429, 430, 431

[56] References Cited

U.S. PATENT DOCUMENTS

| | | | |
|---|---|---|---|
| 3,495,492 | 2/1970 | Gerber et al. | 83/374 |
| 3,548,697 | 12/1970 | Gerber et al. | 83/648 |
| 4,581,762 | 4/1986 | Lapidus et al. | 382/22 |
| 4,853,970 | 8/1989 | Ott et al. | 382/54 |
| 4,955,062 | 9/1990 | Terui | 382/8 |
| 5,020,405 | 6/1991 | Wolfson et al. | 83/374 |
| 5,333,111 | 7/1994 | Chaiken et al. | 364/470 |

FOREIGN PATENT DOCUMENTS 2038925  8/1993  Spain.

OTHER PUBLICATIONS

Translation of Patent 2038925–Spain.

*Primary Examiner*—Paul P. Gordon
*Attorney, Agent, or Firm*—McCormick, Paulding & Huber

[57] ABSTRACT

A system for adjusting the marker in preparation for cutting that is adapted for use with fabrics having a stripe or plaid design is characterized by computer assisted design matching that provides for automatic alignment of the fabric web with the cutting apparatus as well as matching fabrics whose designs vary in contrast. The present system also provides for coordinate matching between an image obtained by the system's camera and the actual fabric.

20 Claims, 6 Drawing Sheets

GARMENT MARKER SYSTEM HAVING COMPUTER ASSISTED ALIGNMENT OF VARIABLE CONTRAST CLOTH DESIGNS

TECHNICAL FIELD

The present invention relates to garment marker systems in general and more particularly towards garment cutting systems that have computer assisted marker alignment of fabric designs such as stripes, plaids or engineered prints that present different contrasts to a video camera.

CROSS REFERENCE TO RELATED APPLICATIONS

Some of the subject matter herein is disclosed and claimed in the following U.S. patent and pending U.S. patent applications, all of which are incorporated herein by reference.

U.S. Pat. No. 3,495,492 entitled "Apparatus for Working on Sheet Material";

U.S. Pat. No. 3,548,697 entitled "Apparatus for Cutting Sheet Material";

U.S. patent application Ser. No. 07/694,871 now U.S. Pat. No. 5,333,111, entitled "A Garment Cutting System Having Computer Assisted Pattern Alignment".

U.S. patent application Ser. No. 07/525,870, now U.S. Pat. No. 5,020,405 entitled "Apparatus With Moveable Pins For Spreading And Cutting Layups Of Sheet Material".

BACKGROUND OF THE INVENTION

Computerized garment marker generation and cutting systems are well known in the art. Known systems include those offered by the assignee of the present invention, such as Gerber Garment Technology (GGT) models S-91, S-93 and S-95. In general, these known systems utilize a marker generated with a computer to optimize piece pattern density and thereby minimize the waste of fabric. However, fabrics which have a plaid or stripe are troublesome in that the clothing designer can specify an alignment of the pattern in several adjacent pieces. Consequently, the highest density of garment segment or piece patterns in the marker placed over the fabric is not necessarily the one which provides pattern alignment.

In the past, the computerized marking systems simply generated a marker having fairly large tolerances between adjacent patterns. The cloth to be cut was provided to a skilled worker who would manually align the several patterns with the geometric fabric design in the cloth and thereafter cut the cloth. As a result, garments having geometric designs therein, such as stripes or plaids, invariably has resulted in higher garment costs due to the increased waste and the use of slow, skilled labor in the cutting process.

A known garment cutting system adapted for use with fabrics having a stripe or plaid design is disclosed and claimed in the aforementioned U.S. patent application Ser. No. 07/169,487 now U.S. Pat. No. 5,333,111. The '871 system is characterized computer assisted design matching that allows for either manual or automatic matching both between a garment marker to the fabric layup and between sequenced garment segment patterns. The '871 system employs data reduction techniques to reduce processing time and includes apparatus for optimizing image stability, focus and illumination.

It would be advantageous to have a system which could provide computer assisted geometric fabric design alignment between these marker patterns and the cloth, so that the advantageous computer controlled cutting knives and the like can be used regardless of the contrast presented to a scanning video camera by geometric fabric designs which may be present in the cloth. The present invention is drawn toward such a system.

SUMMARY OF INVENTION

An object of the present invention is to provide a system for use in adjusting the marker in preparation for cutting sheet fabric having a design therein that provides for alignment of garment segment patterns in a marker with the fabric design location regardless of misalignment of the fabric web.

Another object of the present invention is to provide a system of the foregoing type in which alignment is achieved regardless of the contrast level presented by the fabric design to the camera.

Still another object of the present invention is to provide a system of the foregoing type which provides for calibration between the coordinates in a web and the corresponding image pixel signals.

According to the present invention, a method for aligning a garment segment pattern at a selected location in a marker with a geometric design in a fabric web on an upper surface of a table in a system having a moveable video sub-system including a camera having an array of pixel elements configured to receive light from a portion of the fabric web and provide electrical signal equivalents thereof, the method includes the steps of receiving marker signals including garment segment pattern signals and a reference signal corresponding to a reference location in said marker of the fabric design and camera pixel element alignment therewith. The method also includes receiving, from the camera video sub-system signals including signals corresponding to the fabric web design; generating signals indicative of initial web fabric design alignment as compared to the marker reference location and computationally rotating the web fabric design signals to a plurality of angularly separated positions. The method also has as steps comparing, at each of the plurality of angularly separated positions, the rotated web fabric design signals with the camera pixel element alignment signals and generating therefrom signals indicative of corresponding web alignment; selecting the one of the plurality of angularly separated positions which yields the greatest alignment of the camera pixel elements with the web fabric design; and generating signals to adjust the position of the garment pattern signals in the marker to remove any offset between the initial web fabric design alignment and the selected one of the plurality of angularly separated positions.

According to another aspect of the present invention, a method for aligning a garment segment pattern at a selected location in a marker with a high contrast geometric design in a fabric web on an upper surface of a table in a system having a moveable video sub-system including a camera having an array of pixel elements configured to receive light from a portion of the fabric web and provide electrical signal equivalents thereof includes the steps of receiving marker signals including garment segment pattern signals and a reference signal corresponding to a reference location in the marker of said fabric design. Also included are the steps of receiving, from the camera video sub-system signals including signals corresponding to the fabric web design at the reference location and receiving, from the camera video sub-system, signals including signals corresponding to said fabric web design at a match location. There are the steps of generating, for the reference location and the match location signals, signals corresponding to respective low resolution images including the further steps of configuring a blurring pixel array corresponding to a subset of a plurality of pixel element positions centered about a given pixel element; assigning a weighting value for each of the pixel array subset element positions; computing, for each of the reference and match image pixel signals, a weighted pixel signal value corresponding the sum of the product of the pixel intensity value for each pixel and the corresponding weighting value divided by the number of element positions in the array subset. The present method computes minimum and maximum signal values for the low resolution reference and match images; computes a magnitude range for the low resolution reference and match images and generates, for each of the reference and match image pixel signals, a neighbor array of signals each of whose elements correspond to the differences between a current pixel element and a plurality of adjacent pixel elements. Also included in the present method are the steps of configuring, for the low resolution reference and match neighbor signal arrays, respective computational neighbor pixel arrays corresponding to a first central subset of pixel element positions, including generating signals corresponding to a difference between each corresponding one of the pixel elements in the match and image first computational neighbor pixel arrays and generating signals indicative of a sum of the first pixel element differences. The method also includes the steps of configuring, for the match image, a computational neighbor pixel array corresponding to a second, non-centered, subset of the neighbor pixel element positions, including generating signals corresponding to a difference between each corresponding one of the pixel elements in the match and image second computational neighbor pixel arrays; generating signals indicative of the second pixel element differences; and generating signals selecting as a match the one of the match computational neighbor pixel arrays corresponding to the lowest of the computational neighbor pixel array sums.

According to yet another aspect of the present invention, a method for aligning a garment segment pattern at a selected location in a marker with a high contrast geometric design in a fabric web on an upper surface of a table in a system having a moveable video sub-system including a camera having an array of pixel elements configured to receive light from a portion of the fabric web and provide electrical signal equivalents thereof includes the steps of receiving marker signals including garment segment pattern signals and a reference signal corresponding to a reference location in the marker of said fabric design; receiving, from the camera video sub-system signals including signals corresponding to the fabric web design at the reference location and receiving, from the camera video sub-system signals including signals corresponding to the fabric web design at a match location. The method also generates, for the reference location and the match location signals, signals corresponding to respective low resolution images by the steps of configuring a blurring pixel array corresponding to a subset of a plurality of pixel element positions centered about a given pixel element; assigning a weighting value for each of the pixel array subset element positions; computing, for each of the reference and match image pixel signals, a weighted pixel signal value corresponding the sum of the product of the pixel intensity value for each pixel and the corresponding weighting value divided by the number of element positions in the array subset. There are also the steps of computing minimum and maximum signal values for the low resolution reference and match images; computing a magnitude range for the low resolution reference and match images; calculating signals corresponding to a scaling factor for the low resolution reference and match images and computing, with the scale factor, scaled low resolution reference and match image signals. The present method also contemplates the steps of configuring, for the low resolution reference and match images, respective computational pixel arrays corresponding to a first central subset of a pixel element positions, including dividing each pixel row of the first computational pixel arrays into a plurality of row segments computing an average pixel intensity value for each of the row segments dividing each pixel column of the computational pixel arrays into a plurality of column segments and computing an average pixel intensity value for each of the column segments. Also included are the steps of generating, for each of the row segments, previous row transition signals corresponding to a difference between average intensity values for a current one of the row segments and a corresponding row segment in a previous row; generating previous row transition difference signals corresponding to a difference between each corresponding one of the previous row transition signals in the match and image first computational pixel arrays; generating, for each of the row segments, subsequent row transition signals corresponding to a difference between average intensity values for the current one of the row segments and a corresponding row segment in a subsequent column; and generating subsequent row transition difference signals corresponding to a difference between each corresponding one of the subsequent row transition signals in the match and image first computational pixel arrays. Similarly, the method includes the steps of generating, for each of the column segments, previous column transition signals corresponding to a difference between average intensity values for a current one of the column segments and a corresponding column segment in a previous column; generating previous column transition difference signals corresponding to a difference between each corresponding one of the previous column transition signals in the match and image first computational pixel arrays; generating, for each of the column segments, subsequent column transition signals corresponding to a difference between average intensity values for the current one of the column segments and a corresponding column segment in a subsequent column; generating subsequent row transition difference signals corresponding to a difference between each corresponding one of the subsequent row transition signals in the match and image first computational pixel arrays; and generating signals indicative of a sum of the column segment and the row segment differences. There are also steps for configuring, for the match image, a computational pixel array corresponding to a second, non-centered, subset of a pixel element positions, including; dividing each pixel row of the second computational pixel arrays into a plurality of row segments; computing an average pixel intensity value for each of the row segments; dividing each pixel column of the second computational pixel arrays into a plurality of column segments; and computing an average pixel intensity value for each of the column segments. Also, there are the steps of generating, for each of the row segments, previous row transition signals corresponding to a difference between average intensity values for a current one of the row segments and a corresponding row segment in a previous row; generating previous row transition difference signals corresponding to a difference between each corresponding one of the previous row transition signals in the match and image first computational pixel arrays; generating, for each of the row segments, subsequent row transition signals corresponding to a difference between average intensity values for the current one of the row segments and a corresponding row segment in a subsequent column and generating subsequent row transition difference signals corresponding to a difference between each corresponding one of the subsequent row transition signals in said match and image first computational pixel arrays. The method includes the steps of generating, for each of the column segments, previous column transition signals corresponding to a difference between average intensity values for a current one of the column segments and a corresponding column segment in a previous column; generating previous column transition difference signals corresponding to a difference between each corresponding one of the previous column transition signals in the match and image first computational pixel arrays; generating, for each of the column segments, subsequent column transition signals corresponding to a difference between average intensity values for the current one of said column segments and a corresponding column segment in a subsequent column; generating subsequent row transition difference signals corresponding to a difference between each corresponding one of the subsequent row transition signals in the match and image first computational pixel arrays; generating signals indicative of a sum of the column segment and the row segment differences; and generating signals selecting as a match the one of the match computational arrays corresponding to the lowest of the transition difference sums.

DESCRIPTION OF THE PREFERRED EMBODIMENT

In the following description, an illustrative embodiment of the present invention is described in connection with the use of apparatus shown and described in U.S. Pat. No. 3,495,492 entitled "Apparatus for Working on Sheet Material" and U.S. Pat. No. 3,548,697 entitled "Apparatus for Cutting Sheet Material", which are assigned to the assignee of the present invention. It will be appreciated that the invention is not limited solely to the use of such apparatus.

Figure 1:
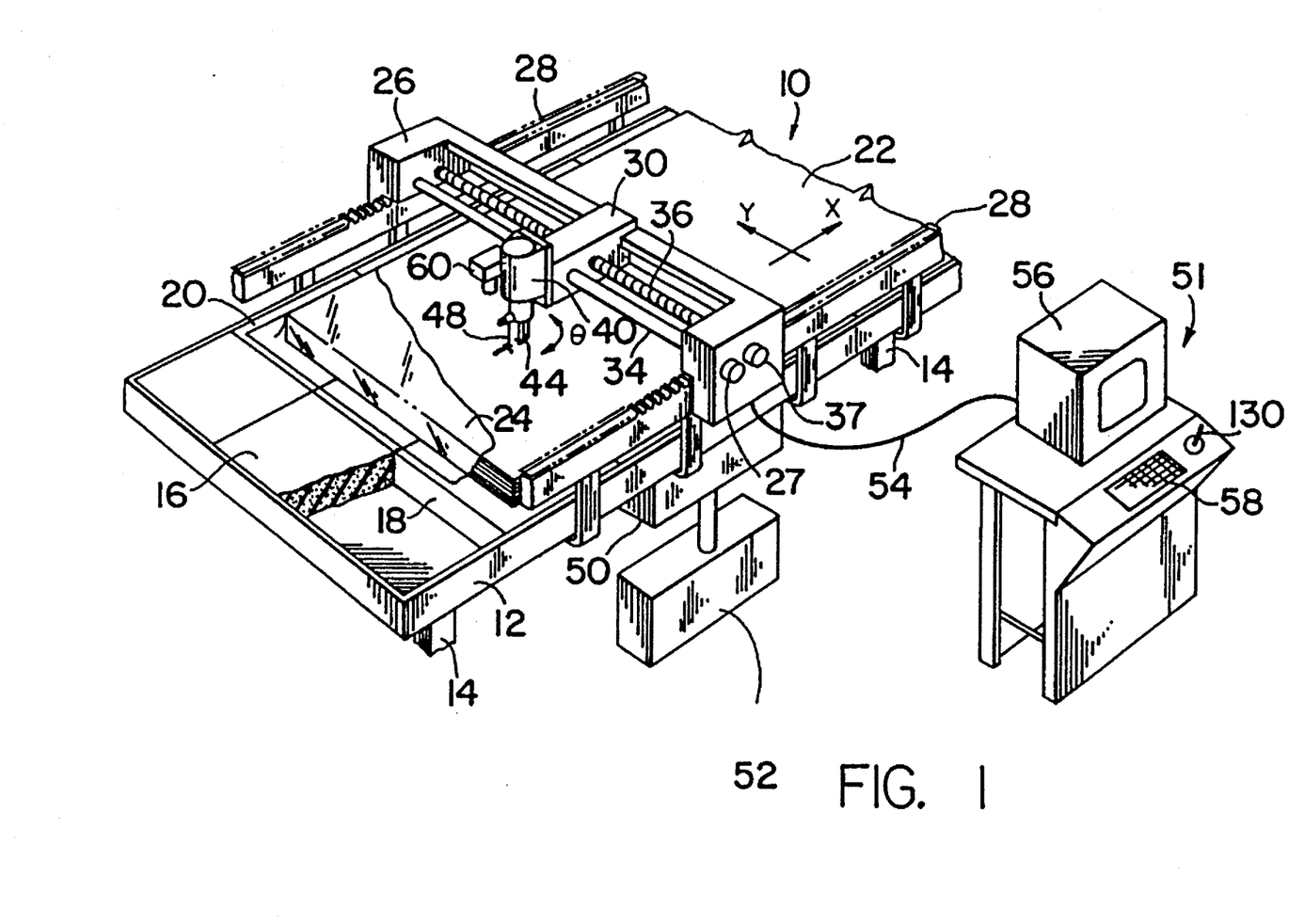
FIG. 1 is a simplified schematic illustration of a system as provided by the present invention.
Figures 6, 7, 9, 10, 16:
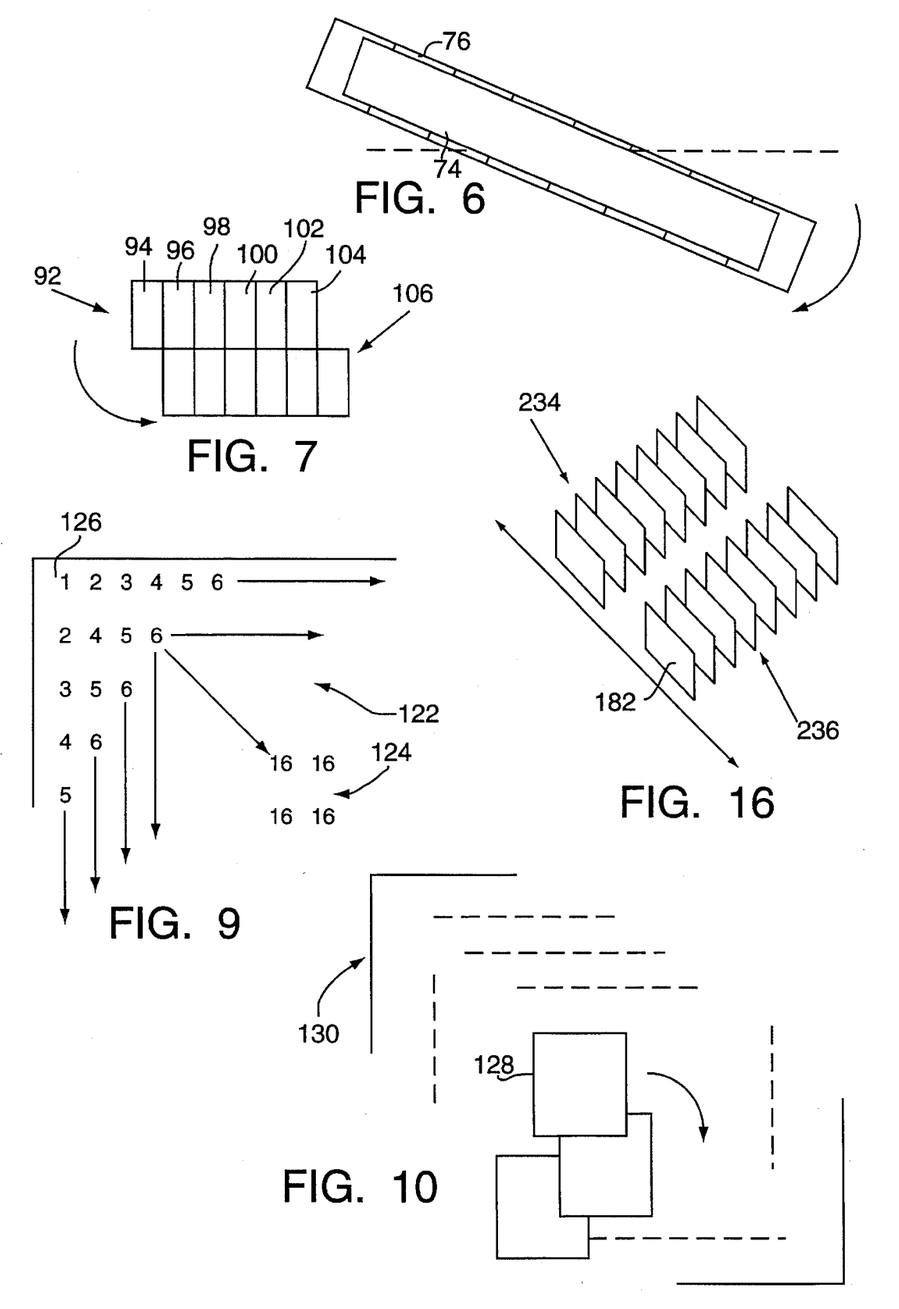
FIG. 6 is a simplified schematic illustration of the fabric pattern and camera pixels of FIG. 4 after computational rotation.
FIG. 7 is a simplified schematic drawing illustrating row segment shifting as performed by the system of FIG. 1.
FIG. 9 is a schematic illustration of a Gaussian weighting function executed by the system of FIG. 1.
FIG. 10 is a simplified illustration displaying the relative displacement of an image computational pixel array that is a subset of an image.
FIG. 16 is a diagrammatic illustration of a portion of the pixel array of FIG. 13 with neighbor table elements.

Referring now to FIG. 1, a sheet material or fabric cutting system, which is referred to generally with the reference character 10, is shown having a table 12 supported on legs 14 therefor. The table 12 is in the form of a container-like frame which carries a plurality of plastic blocks 16, having bristles arranged to form a penetrable bed 18 having a flat upper surface 20 thereon. The substantially continuous planar surface 20 formed by the upper surfaces of the blocks 16 supports a layup or spread 22 of a single or plurality of plys sheet materials, such as fabric, which are arranged in vertically stacked relation and in position on the surface 20 to be cut. As seen in FIGS. 6 and 7, the sheet fabric has a periodic geometric fabric design 21 woven therein. The layup of sheet material 22 may be covered by a sheet of thin plastic film 24, e.g. polyethylene which serves to contain a vacuum which is applied to the layup 22.

A main carriage 26, which transversely spans the table 12, is supported on the table by a pair of elongated racks 28 mounted on opposite sides of the table 12 and extending longitudinally thereof for moving the carriage 26 in a longitudinal or X direction. The main carriage 26 includes a drive shaft (not shown) which also extends transversely of the table and has pinions mounted at opposite ends for engagement with the racks 28 to move the carriage 26 longitudinally across the table in response to the operation of a drive motor 27 drivingly connected to the shaft. The main carriage 26, moveably carries thereon a cutter carriage 30 mounted for movement in the Y direction on a guide bar or tube 34 and a lead screw 36, which also extends transversely of the table 12 and serves to support and drive the cutter carriage 30 transversely across the table, or in the Y direction, in response to the operation of another drive motor 37 drivingly connected with the lead screw 36.

The cutter carriage 30 has a cutter head 40 mounted thereon for vertical movement relative thereto so as to be capable of being raised and lowered to elevate a reciprocating cutting blade 44 and an associated presser plate mounted thereon from a normal cutting position to a position at which they are located entirely not of contact with and above the fabric layup 22. Thus, when the cutter head 40 is raised, the lower extremity of the blade 42 is positioned above the layup 22 so that the head with the blade may, if desired, be moved to any preselected position above the layup, and then lowered to pierce the layup, thus allowing a cut to be started on any desired position in the fabric. The blade 42 is reciprocated vertically by a motor (not shown) in the cutter head 40, and is also rotated about its own vertical axis, referred to as the Θ (theta) axis, as indicated in FIG. 1, by another motor (not shown) in the cutter head 40. Those skilled in the art will note that other cutting apparatus such as lasers or water may be equidently substituted for the blade.

The cutter head 40 also carries a locator or pointer 48. The pointer is pivotally mounted on a pin projecting from the head so that the pointer may be pivoted into the illustrated operative position in front of the cutter blade for precisely positioning the cutter head 40 and blade relative to a desired location or index mark on the layup 22, and is then swung upward and out of the way to a stowage position after the positioning of the cutter head 40 is performed. Forms of pointers other than that shown in FIG. 1, such as a laser may be utilized to perform the function of accurately positioning the cutter blade 42 over a specific point on the layup 22.

The table 12 is provided with ducts 50 which are connected to a vacuum pump 52. The plastic overlay or film 24 on the spread or layup 22 serves to contain the vacuum applied through the table surface or bed 18 of porous or vertically vented plastic blocks 16, causing the sheet material or fabric in the layup 22 to be compressed into a firm stack that will not shift during cutting. The drawing, for ease of illustration, only shows one table segment and a diagrammatic illustration showing of the vacuum system; but it will be understood that each table segment has a separate vacuum valve which is actuated by the carriage 26 when it is over a particular segment. Vacuum is applied, therefore, only to the area under the carriage to hold the fabric being cut. This allows the cut bundles to be easily removed, and makes the application of the vacuum from a single source practical.

If it is desired to cut more than one layer of fabric having designs thereon, it may also be desirable to provide the cutting table with a system of pins to facilitate spreading fabric with the design of each layer corresponding to the adjacent layer. Such a system is described in U.S. patent application Ser. No. 07/525,870, mow U.S. Pat. No. 5,020,405 entitled "Apparatus With Moveable Pins For Spreading And Cutting Layups Of Sheet Material", and assigned to the same assignee as this application. Alternately, the fabric can be spread with the designs on the various layers corresponding before the fabric layup is placed on the table.

The cutting system 10 includes a controller 52 which sends and receives signals on lines 54 and processes those signals in accordance with algorithms detailed hereinafter. The controller comprises a video display 56 of a known type as well as a conventional keyboard 58. The controller includes a PC type computer with sufficient computer memory and other peripheral hardware to perform the functions set forth herein. The controller may also include a "video frame grabber"/image processing circuitry such as the Targa Plus board marketed by the TrueVision company.

As is known, a marker is comprised of a plurality of adjacent garment segments or panels configured as close as possible to minimize the waste of fabric. The present system is adapted to use a computer generated data file resident in the controller as a marker. Great care must be exercised with a plaid or other fabric having a repeating design to position the pattern so that the garment segments will have the desired alignment when sewn together. Consequently, the marker includes not only information regarding the perimeter of the garment segments but also contains data on the fabric design and the desired relationship of the particular garment segments. This correlating information is in the form of matching and reference points typically located in the interior of the patterns where a particular point in the fabric design is supposed to lie.

The result of the garment fabrication parameters such as imprecise dimensional differences in the design repeat as well as the effects of bowing and skewing caused by poor control during the fabric finishing operations forces the marker maker to leave relatively large buffers around the garment segment patterns that require matching; often as much as half a fabric design repeat. In the present context, "matching" is defined as the alignment of fabric design repeats in the fabric from one segment of a garment to a corresponding segment, i.e. the top sleeve of a man's coat matching the front part thereof at a specified point. The amount of buffer or extra fabric allowance required to bring a garment segment into alignment with its neighbor is a factor derived from the repeat of the fabric design and the quality level of the fabric in use.

Enough buffer must be left to allow the system or operator to move the pattern to a different position other than that chronologically by the marker maker on the CAD system. Automated system must compute the amount of offset needed to properly align the marker with the actual fabric pattern. Moreover, it is sometimes necessary to align the marker or a portion(s) with the web of the fabric because the web has been fed onto the cutting table at a slight angle or because of inaccuracies in the fabric. The present system has the capability of accomplishing these objectives, as detailed herein.

Figure 2:
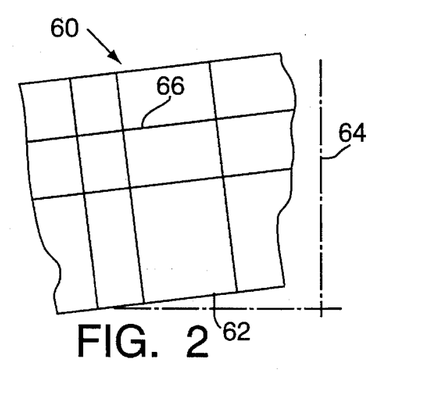
FIG. 2 is a simplified schematic illustration of a portion of a misaligned web on a table of the system of FIG. 1.

Referring now to FIG. 2 there is shown a simplified schematic illustration of a portion of a misaligned web 60 on the cutting table of the present system. The amount of misalignment 62 as compared to a reference coordinate system 64 is exaggerated for illustrative purposes. It is important to initially determine the presence and extent of any misalignment of the web as the fabric pattern 66 to marker match will obviously be globally affected. The present system checks for any misalignment and provides for a corresponding correction, as seen by way of reference to FIGS. 3–6.

In theory, the video image of a fabric design or pattern comprises a row (or column) of image pixels which are the same intensity so that intensity variations between adjacent pixels in a row are minimal, either along the design or in the fabric field. However, when the pattern is misaligned, the pixel row 76 crosses the fabric design 74 as in FIG. 4 producing a wide variation in the respective pixel intensities as compared to each other and an average. A row skew index indicates the degree of similarity between an average pixel intensity value and each respective pixel in that row.

Figure 3:
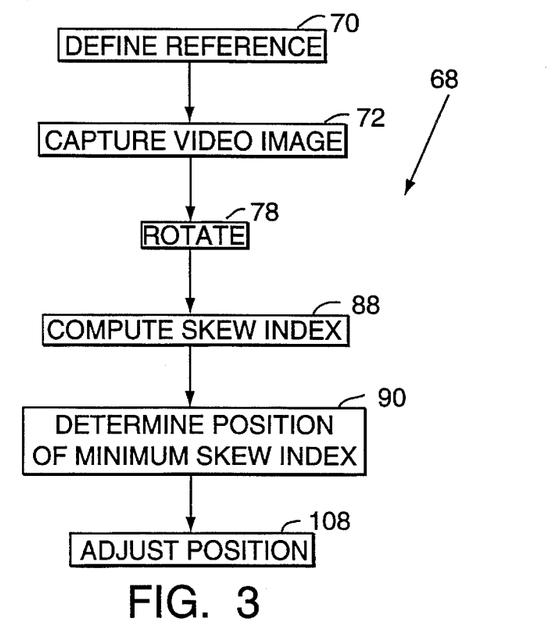
FIG. 3 is a diagrammatic illustration of an algorithm executed by the system of FIG. 1 in adjusting a marker for misalignments of the web.
Figure 4:
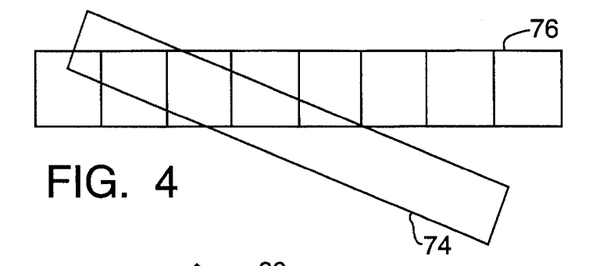
FIG. 4 is a simplified schematic drawing illustrating a fabric pattern portion misaligned relative to camera pixels.

FIG. 3 details an algorithm 68 executed by the present invention in performing a fabric web alignment. After defining reference coordinates (block 70), a video image centered over the fabric piece to be matched is captured at block 72. As seen in FIG. 4, the fabric design 74 is initially skewed with respect to a row of pixels 76 in the system's camera. It is presumed that the camera is aligned initially with the reference coordinates.

Figure 5:
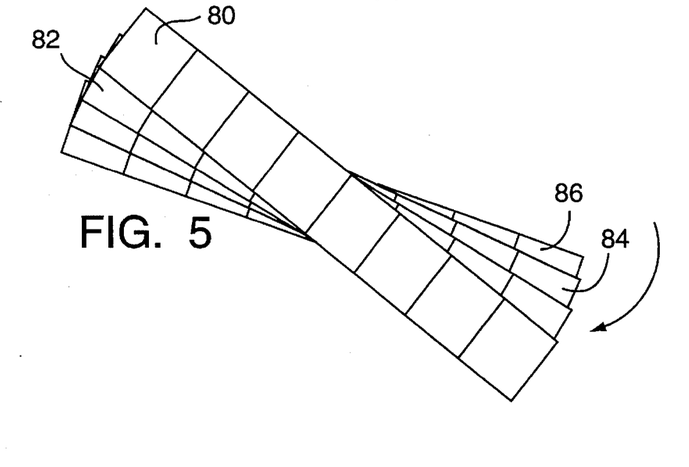
FIG. 5 is a simplified schematic drawing illustrating computational rotation as executed by the system of FIG. 1.

The video image is computationally rotated through a range of angles (block 78). The present invention does not rotate the camera, as that would require additional hardware and software whose cumulative effect would be to slow the overall performance of the system. Rather, the video image is computationally rotated as detailed below. In the preferred embodiment, the video image is rotated between −20 degrees and +20 degrees in one degree increments. The effect of the computational rotation is seen in FIG. 5 where the pixel row is shown in positions 80–86. The video image's skew index is calculated at each position (block 88). Of the forty-one positions, the position which returns the smallest skew index is the position with the best horizontal web alignment. FIG. 6 diagrammatically shows that the smallest skew index would occur if the pixel row was "rotated" by the amount needed to align the design with the pixel row and thereby remove any misalignment (block 90).

The following steps are executed by the present system to calculate the skew index for the video image. The skew index is initially set to zero. For each row of pixels, the average red, green, and blue pixel intensity values are first computed. For each pixel in the row, the difference between the average red pixel intensity value and the current pixel's red intensity value is obtained and summed This process is repeated for green and blue pixels. All sums are added to calculate the skew index. In the preferred embodiment a color image is processed, although those skilled in the art will recognize that the techniques set forth herein are readily adapted to two state black and white or gray scale images.

Computational rotation of a rasterized video image is achieved by shifting variable sized row segments right and either up or down as seen in FIG. 7. Row segment 92 is comprised of pixels 94–104. In the Figure, row segment 106 is an image of row segment 92 computationally rotated in a counterclockwise direction. That is, the video image pixels are shifted down and to the right. Clockwise rotation is achieved by rotation up and to the left. The row segment length is selected to be equal to cotangent (position in degrees). Those skilled in the art will note that the rotation of row segment in a given row leads directly to the subsequent position of adjacent row segments. Moreover, in the preferred embodiment, a subset of pixels in the image is used in this process. After computing the amount of rotation needed to achieve minimum skew index, the system adjust the position of the garment segment patterns in the marker to reflect the same (block 108).

As noted above, in fabric cutting applications, it is sometimes necessary to align a point on one garment or upholstery segment with a similar point on one or more other pieces. Fabric nonuniformity makes it impossible to predict the exact location where similar points will be found. If a video camera captures an image at a reference point on the fabric, and then captures a second image over the approximate match point, it is possible to align the two images, and calculate an offset. Often, fabric repeats are only delineated by colored lines which vary in intensity and that only comprise a small percentage of the image. These lines can be missed by the system during alignment unless they are enhanced.

Figure 8:
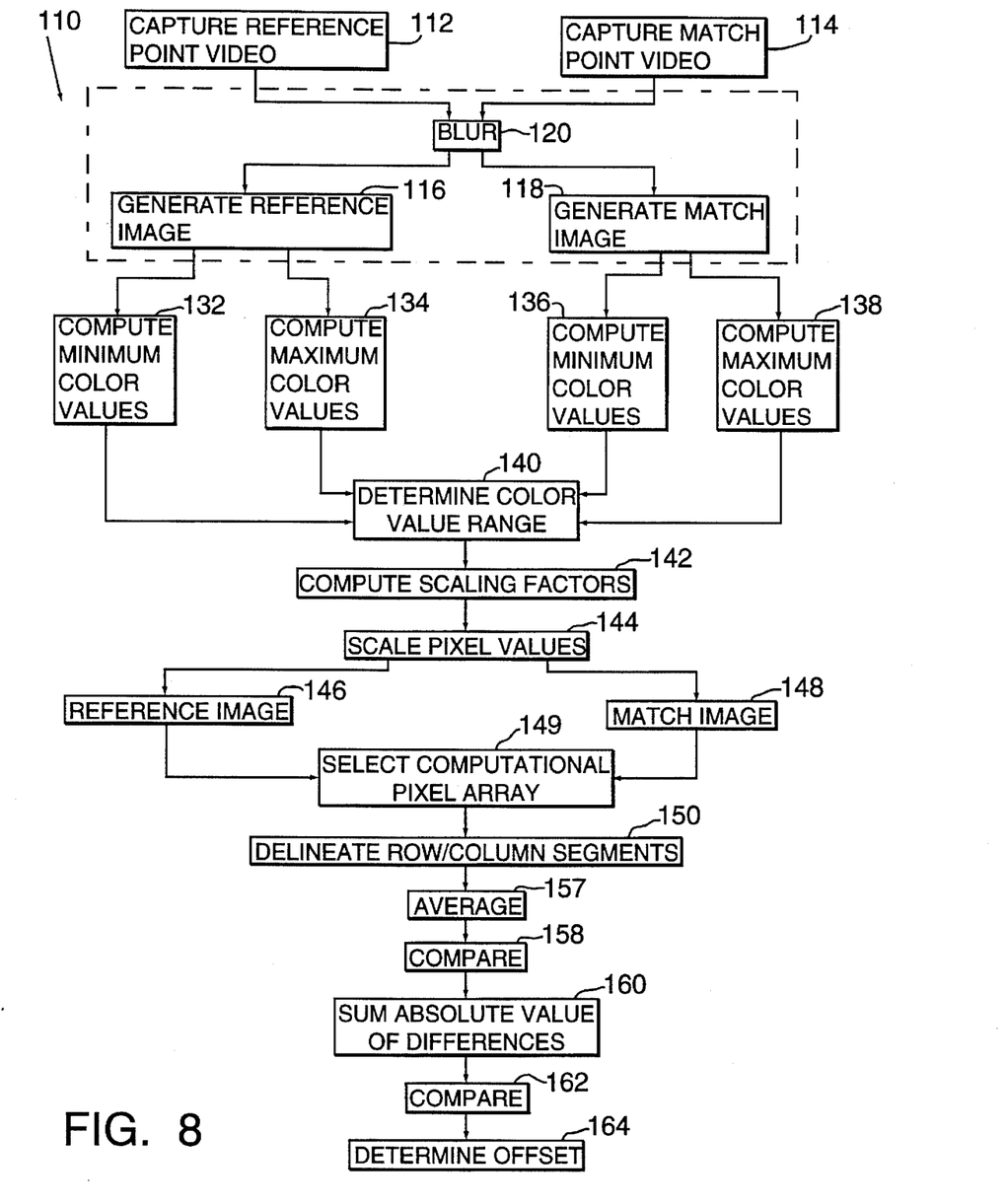
FIG. 8 is a diagrammatic illustration of an algorithm executed by the system of FIG. 1 in matching patterns and fabric designs having high contrast.

The present system includes apparatus for executing an algorithm to perform video image alignment on images of moderate to high contrast fabrics. FIG. 8 is a diagrammatic illustration of an algorithm 110 executed by the present invention in enhancing high contrast fabric design or pattern matching. Video images respectively centered over both the reference point and the point where the match point would be found if the fabric were completely uniform are captured at blocks 112, 114. Low resolution reference and match images are generated (blocks 116, 118) by "blurring" (block 120) the original images, and storing the results in memory. The blurring process is used to alleviate the coarse transitions in features which inherently occur in the processing of the digital camera signals and to reduce the amount of data to be processed.

The actual value placed in each low resolution pixel is the result of a Gaussian Blur performed on a 16×16 pixel block of the original image. The 16×16 pixel blocks overlap each other in the four upper and lower rows, and the four leftmost and rightmost columns. The Gaussian blurring process also involves the application of a weighting function which results in the assignment of a weight to each pixel in a computational pixel array. FIG. 9 is a simplified, partial diagram of a computational pixel array 122. Elements in the array are assigned a numerical weight with the center four pixels 124 having a value sixteen times that of the corner elements, such as element 126. In the preferred embodiment, each pixel in the low resolution image corresponds to an 8×8 pixel block in the original image. Each computational array is offset by 8 pixels in the preferred embodiment. The process is visualized in FIG. 10 in which computational array 128 is indexed about image array 130.

Referring again to FIG. 8, the minimum and maximum intensity values for each of the red, green, and blue colors is computed for both the low resolution reference image (blocks 132, 134) and match image (blocks 136, 138). Thereafter, the range of red, green, and blue values in the low resolution images is found at block 140. For example, the red range is the difference between red maximum and red minimum values. The red, green, and blue scaling factors are calculated at block 142. The red scale equals the maximum possible value divided by the red range. If it is assumed that the red range has a value of 60 and maximum possible value of 255 then the red scale corresponds to 255/60 or 4.25. Scales for the other colors are computed in the same manner.

All pixels values are scaled (block 144) in the low resolution reference and match images (blocks 146, 148). For the red pixels, the red minimum is subtracted from the red value for each pixel. The result is multiplied by the red scale value If it is assumed in the present example that the red scale equals 4.25, the red minimum is 32, and original red value is 52, then the red scaled value for this pixel is red =(52−32)*4.25=85. Here again the same calculation is used to scale the pixel signals for the other colors.

Central regions of both the low resolution reference and images are selected to be computational pixel arrays in the manner detailed above (block 149). In the preferred embodiment, the central region is chosen to be one half the width and height of the low resolution images. The origin of these regions is given by X=(image width/4), Y=(image height/4). All rows in this region are divided into two or more partially overlapping row segments at block 150. As shown in schematic form in FIG. 11, row segment 152 is adjacent pixels from two other row segments 154, 156. The pixels in the current row segment are given a weight of 1 while pixels in the adjacent row segments are assigned a weight of 0.5. The pixel intensity values are multiplied by the respective weights prior to the calculating an average pixel intensity value. In the preferred embodiment, the leading and trailing row segments each contribute four pixels at a weight of 0.5 to the calculation so that there are eight pixels at a weight of 0.5 and eight pixels at a weight of one. This weighting and averaging process mitigates against the effects of transitions in the pixel image signals.

Figure 11:
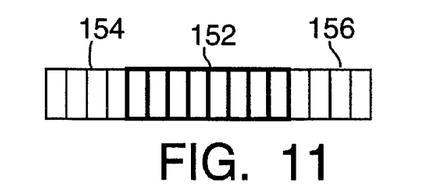
FIG. 11 is a simplified illustration of a row segment of image pixels with adjacent pixels used in an intensity averaging algorithm executed by the system of FIG. 1.

The average red, green, and blue intensity value for all row segments in the region is computed as above (block 157). Thereafter, all columns in this region are divided into two or more partially overlapping column segments and the average red, green, and blue value for all column segments in the region is computed. The same process occurs for the selected region of the low resolution match image. This region is also one half the width and height of the corresponding low resolution image with an origin at a point with the region defined by (XO=O, YO=O, Xl=(image width/4), Yl=(image height/4). All rows in this region are divided into 2 or more partially overlapping row segments and the average red, green, and blue value for all row segments in the region is calculated. The process is identical for the overlapping column segments.

The present system removes the effects of variations in intensities between the match and reference images by first computing average intensity differences for adjacent row and column segments and then comparing those differences with corresponding differences in the match image. For a given row in a reference region, there are at least two row segments having an average intensity computed as above. The present system compares the average intensity for a given row segment with an average row segment intensity in a row segment in a previous row. The difference therebetween is compared with a corresponding difference in the match region. For the same given row segment, the average intensity is also compared with an average row segment intensity in a subsequent row, with the difference therebetween compared with a corresponding difference in the match region. This process is also performed with the column segments (block 158). The absolute values of all the differences is summed (block 160).

A new origin for new match and image regions is selected and the above process is repeated for all possible origin points in the regions. These summed absolute values are compared (block 162) to determine which position of the computational array (as denoted by its respective origin) is the closest match to the reference. Thereafter, the offset of the match to the reference is determined (block 164) and removed to allow for proper alignment of the fabric and marker garment segments.

Figure 12:
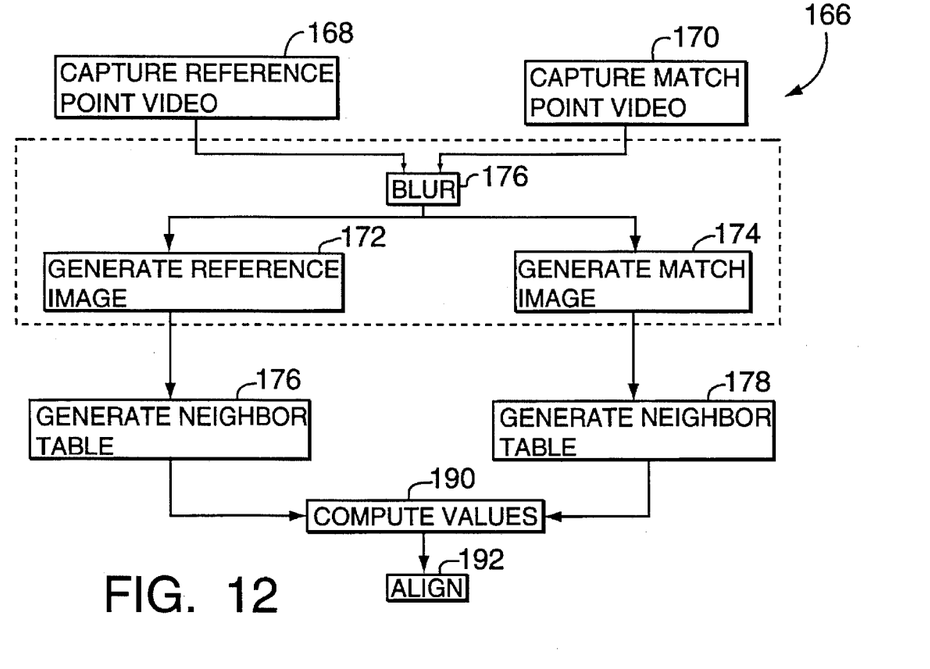
FIG. 12 is a diagrammatic illustration of an algorithm executed by the system of FIG. 1 in matching patterns and fabric designs having low contrast.

FIG. 12 is a diagrammatic illustration of an algorithm 166 executed by the present system to perform video image alignment on images of moderate to low contrast fabrics under non-uniform lighting conditions. At block 168, a video image centered over the reference point is captured. A corresponding video image centered over the point where the match point would be found if the fabric were completely uniform is also gathered at block 170.

In the manner described hereinabove, low resolution reference and match images (blocks 172, 174) are generated by "blurring" the original images, and storing the results in memory (block 176). With the present system, each pixel in the low resolution image corresponds to an 8×8 pixel block in the original image. The actual value placed in each low resolution pixel is the result of the Gaussian blur performed on a 16×16 pixel block of the original image. Here again, the 16×16 pixel blocks overlap each other in the four upper and lower rows, and the four leftmost and rightmost columns.

in many applications, the images obtained by the camera will be acquired in different light intensities. Simple comparison of intensities are not desirable as the results will be degraded by any intensity variation between match and reference images. The present system generates a table of signals referred to as a "neighbor" table for both low resolution images (blocks 176, 178), and stores the resultant signals in system memory. The purpose of the neighbor table analysis is to remove the effect of these intensity variations by comparing intensity transitions.

A neighbor table is a two dimensional matrix consisting of four or more entries per low resolution pixel. Each entry corresponds to the difference in value between a pixel and its neighboring pixels. In the preferred embodiment, eight neighboring pixels are stored in a neighbor table. In general, the neighboring pixels of pixel(X,Y) are as follows:

PIXEL(X+1,Y)
PIXEL(X+1,Y+1)
PIXEL(X,Y+1)
PIXEL(X−1,Y+1)
PIXEL(X−1,Y)
PIXEL(X−1,Y−1)
PIXEL(X,Y−1)
PIXEL(X+1,Y−1)

Figure 13:
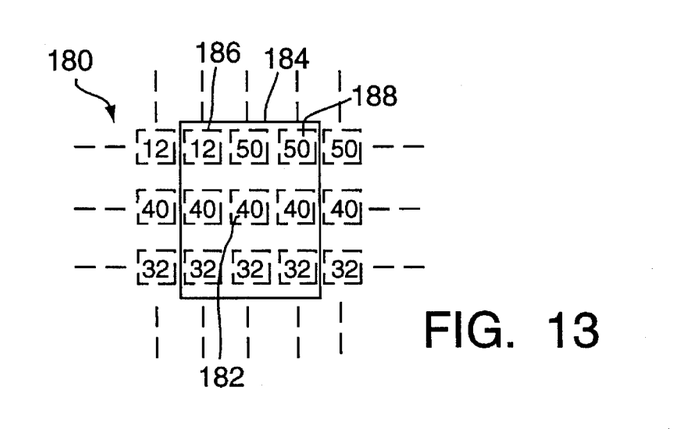
FIG. 13 is a diagrammatic illustration of adjacent pixels with their respective relative intensity values as used by an algorithm executed by the system of FIG. 1 in computing a weighted average of adjacent image pixels.

FIG. 13 diagramatically illustrates the neighbor table computation. A portion of a pixel array 180 is shown with each pixel's intensity. Pixel 182 has an intensity of 40. To compute the neighbor table, this intensity value is compared with the eight surrounding pixels indicated at box 184, to obtain the total difference therebetween. The comparison of pixel 182 with pixel 186 yields +28, with pixel 188 yields −10, etc. Each neighbor table has eight entries in the preferred embodiment for each pixel, yielding a three dimensional array eight times the size of the original signal arrays. This concept is shown diagrammatically in FIG. 16. Shown therein is a portion 234 of the pixel array of FIG. 13 with neighbor table elements 236 for pixel 182.

A central region of the low resolution reference image is then selected to form a computational pixel array as before. This region is one half the width and height of the low resolution image. The origin of the region is given by X=(image width/4), Y=(image height/4). A corresponding region of the low resolution match image is selected, again to form a computational pixel array. This region is also one half the width and height of the corresponding low resolution image. The origin of this region is a point with the region defined by (XO=O, YO=O, Xl=(image width/4), Yl=(image height/4)).

In a manner similar to that described above, a central region of the reference image's neighbor table (ICENTER) is aligned to the most similar position in the match image's neighbor table (J). In the preferred embodiment, this is accomplished by calculating (block 190) an error value for all possible XY positions when the central region of the reference image's neighbor table is compared with the match image neighbor table. The error value is calculated by summing the difference for each entry of the central region of the reference image's neighbor table and the corresponding entry of the match image's neighbor table. A new origin for new match and image regions is selected and the above process is repeated for all possible origin points in the regions. The possible origin points naturally include only those points which yield a complete computational array, since it is not possible to gather pixels outside the image In a good match, the neighboring positions return an error value that is lower than positions that are more than one pixel from the match position The position which results in the smallest error value is assumed to be the low resolution match point. Thereafter, the marker is aligned to remove any offset (block 192).

In general, the images used by a computer vision system in motion control application must be calibrated to real world coordinates. The calibration is done by placing an object of known size in a system camera's field of view, counting the row of pixels that make up the objects width and the columns of pixels that make up the object's height, and calculating the real world size of a single pixel. This is a slow and difficult manual process. An automated process is obviously preferred.

Figure 14:
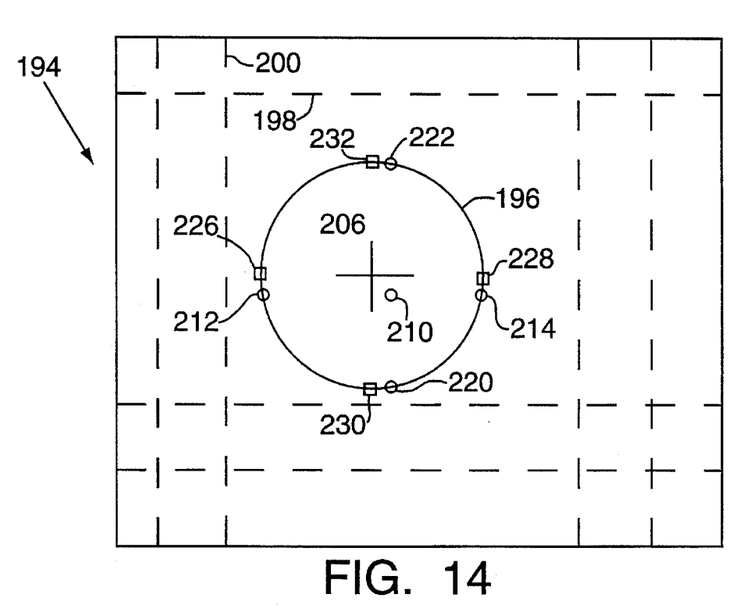
FIG. 14 is a simplified schematic illustration of a portion if a video image gathered by the system of FIG. 1 including a calibration object.
Figure 15:
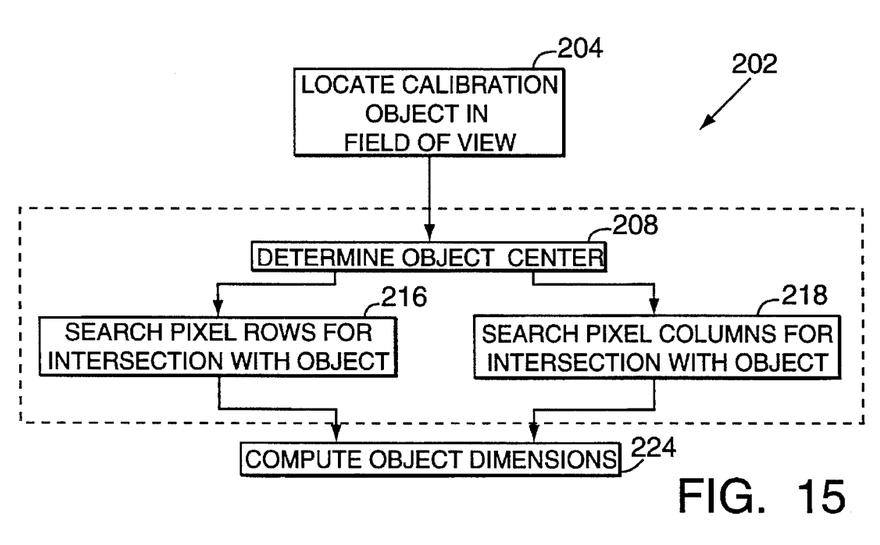
FIG. 15 is a diagrammatic illustration of an algorithm executed by the system of FIG. 1 in calibrating real world to video image coordinates.

In the present system, the lens for the camera is located approximately ten inches from the surface of the table. The fabric sheet can vary in thickness over one inch based on the number of plys and fabric type. There is a need to calibrate the camera pixel coordinates to those of the actual fabric because of this variation in camera lens and fabric separation. The present system is also characterized by apparatus for executing an algorithm to perform video image to real coordinate calibration in an automatic, efficient, and accurate manner. Initially an object or design of known size must be selected for viewing. Due to its insensitivity to rotation or skewing, a circle is the perfect calibration object. FIG. 14 is a simplified schematic illustration of a camera image 194. Visible therein is a calibration circle 196 placed on the topmost ply of a fabric having vertical and horizontal lines 198, 200 in its design. FIG. 15 is a diagrammatic illustration of an algorithm 202 executed by the present system that calibrates video image and real coordinates.

Initially the operator of the present system locates a geometric landmark in the fabric and performs a high resolution match in a manner similar to that described in the aforementioned U.S. patents. It is preferable to minimize the search in the camera's field of view for the calibration object after it has been located there (block 204). This mandates the calibration object be placed such that the center of the camera's field of view falls somewhere within the bounds of the calibration circle. In the search for the object's center 206 (block 208, FIG. 15), selecting the center point 210 of the image as the starting point for the search minimizes the chance of selecting the wrong calibration object should the image contain additional features.

Starting at the point in the center of the field of view, the system searches both left and right for the points where a row of pixels intersects the outer edges of the calibration circle 212, 214 (blocks 216, 218, FIG. 15). Again starting at the point in the center of the field of view, the system search up and down for the points 220, 222 where a column of pixels intersects the outer edges of the calibration circle. The exact center of the calibration circle is given by X=Midpoint of Left and Right X coordinates of points 212, 214. The vertical coordinate is Y=Midpoint of Upper and Lower Y coordinates of points 220, 222.

In addition to the location of the center of the circle, the width and height of the calibration circle can also be found (block 224). Starting at the exact point in the center of the calibration circle, the system searches left and right for the points 226, 228 where this row of pixels intersects the outer edges of the calibration circle. Again, beginning at the exact point in the center of the calibration circle, the system searches up and down for the points 230, 232 where this column of pixels intersects the outer edges of the calibration circle. The size of the calibration circle is defined as follows: Width=distance between the coordinates of points 226, 228, while the height is given by the distance between points 230, 232.

Similarly, although the invention has been shown and described with respect to a preferred embodiment thereof, it should be understood by those skilled in the art that various other changes, omissions and additions thereto may be made therein without departing from the spirit and scope of the present invention.

I claim:

1. A method for aligning a garment segment pattern at a selected location in a marker with a geometric design in a fabric web on an upper surface of a table in a system having a moveable video sub-system including a camera having an array of pixel elements configured to receive light from a portion of the fabric web and provide electrical signal equivalents thereof; said method comprising the steps of:

receiving marker signals including garment segment pattern signals and a reference signal corresponding to a reference location in said marker of said fabric design and camera pixel element alignment therewith;

receiving, from said camera video sub-system signals including signals corresponding to said web fabric design;

generating signals indicative of initial web fabric design alignment as compared to said marker reference location;

computationally rotating said web fabric design signals to a plurality of angularly separated positions;

comparing, at each of said plurality of angularly separated positions, said rotated web fabric design signals with said camera pixel element alignment signals and generating therefrom signals indicative of corresponding web alignment;

selecting the one of said plurality of angularly separated positions which yields the greatest alignment of said camera pixel elements with said web fabric design; and generating signals to adjust the position of said garment pattern signals in said marker to remove any offset between said initial web fabric design alignment and the selected one of said plurality of angularly separated positions.

2. The method according to claim 1 wherein said computational rotation step further comprises the steps of:

dividing said web fabric design signals into a plurality of pixel signal row segments; and shifting the position of said row segments a preselected number of pixels in two orthogonal directions.

3. The method according to claim 2 wherein said dividing step further comprises the steps of selecting said row segments to be equal to a cotangent (position in degrees).

4. The method according to claim 2 further comprising the steps of computing skew index signals including:

initializing said skew index signals to zero value;

calculating, for a row of said web fabric pixel signals, signals indicative of an average row intensity value;

adding, for said pixel row containing said web fabric design signals, signals to said skew index value corresponding to the difference between the average row intensity value and each pixel intensity value in said row;

computing a skew index value for each of said angularly separated positions;

comparing said angularly separated position skew index signals; and generating signals indicative of the one of said angularly separated positions which returns the smallest skew index value.

5. The method according to claim 2 wherein each of said pixels comprises a set of intensity signals indicative of a corresponding plurality of colors.

6. A method for aligning a garment segment pattern at a selected location in a marker with a geometric design in a fabric web on an upper surface of a table in a system having a moveable video sub-system having a camera having an array of pixel elements with a field of view center, said camera configured to receive light from a portion of the fabric web and provide electrical signal equivalents thereof; said method comprising the steps of:

placing a calibration object having a geometrical center within said camera field of view of said camera such that said field of view center lies with the bounds of said calibration object;

searching along a pixel element row containing said field of view center for pixels intersecting said calibration object boundaries;

searching along a pixel element column containing said field of view center for pixels intersecting said calibration object boundaries; generating signals corresponding to the pixel located at the midpoint between said row pixels at said row boundary intersection;

generating signals corresponding to the pixel located at the midpoint between said column pixels at said column boundary intersection; and computing, from said row and column midpoint pixel signals, signals corresponding to the pixel element location corresponding to said object center.

7. The method according to claim 6 further comprising the steps of computing said calibration object height and width including the steps of;

searching along a pixel element row containing said calibration object center for pixels intersecting said calibration object boundaries;

searching along a pixel element column containing said calibration object center for pixels intersecting said calibration object boundaries;

generating signals corresponding to the number of pixels located between said row pixels at said row boundary intersection; and generating signals corresponding to the number of pixels located between said column pixels at said column boundary intersection.

8. A method for aligning a garment segment pattern at a selected location in a marker with a high contrast geometric design in a fabric web on an upper surface of a table in a system having a moveable video sub-system including a camera having an array of pixel elements configured to receive light from a portion of the fabric web and provide electrical signal equivalents thereof; said method comprising the steps of:

receiving marker signals including garment segment pattern signals and a reference signal corresponding to a reference location in said marker of said fabric design and camera pixel element alignment therewith;

receiving, from said camera video sub-system signals including signals corresponding to said fabric web design at said reference location;

receiving, from said camera video sub-system signals including signals corresponding to said fabric web design at a match location;

generating, for said reference location and said match location signals, signals corresponding to respective low resolution images including the steps of:

configuring a blurring pixel array corresponding to a subset of a plurality of pixel element positions centered about a given pixel element;

assigning a weighting value for each of said pixel array subset element positions;

computing, for each of said reference and match image pixel signals, a weighted pixel signal value corresponding the sum of the product of the pixel intensity value for each pixel and the corresponding weighting value divided by the number of element positions in said array subset;

computing minimum and maximum signal values for said low resolution reference and match images;

computing a magnitude range for said low resolution reference and match images;

calculating signals corresponding to a scaling factor for said low resolution reference and match images;

computing, with said scale factor, scaled low resolution reference and match image signals;

configuring, for said low resolution reference and match images, respective computational pixel arrays corresponding to a first central subset of a pixel element positions, including;

dividing each pixel row of said first computational pixel arrays into a plurality of row segments;

computing an average pixel intensity value for each of said row segments;

dividing each pixel column of said computational pixel arrays into a plurality of column segments;

computing an average pixel intensity value for each of said column segments;

generating, for each of said row segments, previous row transition signals corresponding to a difference between average intensity values for a current one of said row segments and a corresponding row segment in a previous row;

generating previous row transition difference signals corresponding to a difference between each corresponding one of said previous row transition signals in said match and image first computational pixel arrays;

generating, for each of said row segments, subsequent row transition signals corresponding to a difference between average intensity values for said current one of said row segments and a corresponding row segment in a subsequent column;

generating subsequent row transition difference signals corresponding to a difference between each corresponding one of said subsequent row transition signals in said match and image first computational pixel arrays;

generating, for each of said column segments, previous column transition signals corresponding to a difference between average intensity values for a current one of said column segments and a corresponding column segment in a previous column;

generating previous column transition difference signals corresponding to a difference between each corresponding one of said previous column transition signals in said match and image first computational pixel arrays;

generating, for each of said column segments, subsequent column transition signals corresponding to a difference between average intensity values for said current one of said column segments and a corresponding column segment in a subsequent column;

generating subsequent row transition difference signals corresponding to a difference between each corresponding one of said subsequent row transition signals in said match and image first computational pixel arrays;

generating signals indicative of a first sum of said column segment and said row segment transition differences;

configuring, for said match image, a computational pixel array corresponding to a second, non-centered, subset of pixel element positions, including;

dividing each pixel row of said second computational pixel arrays into a plurality of row segments;

computing an average pixel intensity value for each of said row segments;

dividing each pixel column of said second computational pixel arrays into a plurality of column segments;

computing an average pixel intensity value for each of said column segments;

generating, for each of said row segments, previous row transition signals corresponding to a difference between average intensity values for a current one of said row segments and a corresponding row segment in a previous row;

generating previous row transition difference signals corresponding to a difference between each corresponding one of said previous row transition signals in said match and image second computational pixel arrays;

generating, for each of said row segments, subsequent row transition signals corresponding to a difference between average intensity values for said current one of said row segments and a corresponding row segment in a subsequent column;

generating subsequent row transition difference signals corresponding to a difference between each corresponding one of said subsequent row transition signals in said match and image second computational pixel arrays;

generating, for each of said column segments, previous column transition signals corresponding to a difference between average intensity values for a current one of said column segments and a corresponding column segment in a previous column;

generating previous column transition difference signals corresponding to a difference between each corresponding one of said previous column transition signals in said match and image second computational pixel arrays;

generating, for each of said column segments, subsequent column transition signals corresponding to a difference between average intensity values for said current one of said column segments and a corresponding column segment in a subsequent column;

generating subsequent row transition difference signals corresponding to a difference between each corresponding one of said subsequent row transition signals in said match and image second computational pixel arrays;

generating signals indicative of a second sum of said column segment and said row segment transition differences; and generating signals selecting as a match the one of said match computational arrays corresponding to the lowest of said first and second sums.

9. The method of claim 8 further comprising the steps of generating signals to adjust the position of said garment pattern signals in said marker to remove any offset between said reference image central computational pixel array position and the position of said match computational pixel arrays corresponding to the lowest of said absolute value sums.

10. The method of claim 8 further comprising the steps of selecting said blurring pixel arrays to be 16 by 16 pixels in dimension.

11. The method of claim 8 wherein said intensity scale has a range between 0–255 in relative magnitude.

12. The method of claim 8 further comprising the steps of averaging each of said row segments with pixels from adjacent row segments.

13. The method of clam 12 further comprising the steps of averaging each of said column segments with pixels from adjacent column segments.

14. A method for aligning a garment segment pattern at a selected location in a marker with a low contrast geometric design in a fabric web on an upper surface of a table in a system having a moveable video sub-system including a camera having an array of pixel elements configured to receive light from a portion of the fabric web and provide electrical signal equivalents thereof; said method comprising the steps of:

receiving marker signals including garment segment pattern signals and a reference signal corresponding to a reference location in said marker of said fabric design and camera pixel element alignment therewith;

receiving, from said camera video sub-system signals including signals corresponding to said fabric web design at said reference location;

receiving, from said camera video sub-system signals including signals corresponding to said fabric web design at a match location;

generating, for said reference location and said match location signals, signals corresponding to respective low resolution images including the steps of:

configuring a blurring pixel array corresponding to a subset of a plurality of pixel element positions centered about a given pixel element;

assigning a weighting value for each of said pixel array subset element positions;

computing, for each of said reference and match image pixel signals, a weighted pixel signal value corresponding the sum of the product of the pixel intensity value for each pixel and the corresponding weighting value divided by the number of element positions in said array subset;

computing minimum and maximum signal values for said low resolution reference and match images;

computing a magnitude range for said low resolution reference and match images;

generating, for each of said reference and match image pixel signals, a neighbor array of signals each of whose elements correspond to the differences between a current pixel element and a plurality of adjacent pixel elements;

configuring, for said low resolution reference and match neighbor signal arrays, respective computational neighbor pixel arrays corresponding to a first central subset of pixel element positions, including;

generating signals corresponding to a difference between each corresponding one of said pixel elements in said match and image first computational neighbor pixel arrays;

generating signals indicative of a sum of said first computational neighbor pixel element differences;

configuring, for said match image, a computational neighbor pixel array corresponding to a second, non-centered, subset of said neighbor pixel element positions;

generating signals corresponding to a difference between each corresponding one of said pixel elements in said match and image second computational neighbor pixel arrays;

generating signals indicative of a sum of said second computational neighbor pixel element differences; and generating signals selecting as a match the one of said match computational neighbor pixel arrays corresponding to the lowest of said computational neighbor pixel element sums.

15. The method of claim 14 further comprising the steps of generating signals to adjust the position of said garment pattern signals in said marker to remove any offset between said reference image computational pixel array position and the position of said match computational pixel arrays corresponding to the lowest of said absolute value sums.

16. The method of claim 14 further comprising the steps of selecting said blurring pixel arrays to be 16 by 16 pixels in dimension.

17. A system for aligning a garment segment pattern at a selected location in a marker with a geometric design in a fabric web, said system comprising a table having an upper surface for receiving said fabric web a moveable video sub-system including a camera having an array of pixel elements configured to receive light from a portion of the fabric web and provide electrical signal equivalents thereof;

a means for receiving marker signals including garment segment pattern signals and a reference signal corresponding to a reference location in said marker of said fabric design and camera pixel element alignment therewith;

a means for receiving, from said camera video sub-system signals including signals corresponding to said fabric web design;

a means for generating signals indicative of initial web fabric design alignment as compared to said marker reference location;

a means for computationally rotating said web fabric design signals to a plurality of angularly separated positions;

a means for comparing, at each of said plurality of angularly separated positions, said rotated web fabric design signals with said camera pixel element alignment signals and generating therefrom signals indicative of corresponding web alignment;

a means for selecting the one of said plurality of angularly separated positions which yields the greatest alignment of said camera pixel elements with said web fabric design; and a means for generating signals to adjust the position of said garment pattern signals in said marker to remove any offset between said initial web fabric design alignment and the selected one of said plurality of angularly separated positions.

18. A system for aligning a garment segment pattern at a selected location in a marker with a high contrast geometric design in a fabric web a table having an upper surface for receiving said fabric web;

a moveable video sub-system including a camera having an array of pixel elements configured to receive light from a portion of the fabric web and provide electrical signal equivalents thereof a means for receiving marker signals including garment segment pattern signals and a reference signal corresponding to a reference location in said marker of said fabric design and camera pixel element alignment therewith;

a means for receiving, from said camera video sub-system signals including signals corresponding to said fabric web design at said reference location;

a means for receiving, from said camera video sub-system signals including signals corresponding to said fabric web design at a match location;

a means for generating, for said reference location and said match location signals, signals corresponding to respective low resolution images including the steps of:

a means for configuring a blurring pixel array corresponding to a subset of a plurality of pixel element positions centered about a given pixel element;

a means for assigning a weighting value for each of said pixel array subset element positions;

a means for computing, for each of said reference and match image pixel signals, a weighted pixel signal value corresponding the sum of the product of the pixel intensity value for each pixel and the corresponding weighting value divided by the number of element positions in said array subset;

a means for computing minimum and maximum signal values for said low resolution reference and match images;

a means for computing a magnitude range for said low resolution reference and match images;

a means for calculating signals corresponding to a scaling factor for said low resolution reference and match images;

a means for computing, with said scale factor, scaled low resolution reference and match image signals;

a means for configuring, for said low resolution reference and match images, respective computational pixel arrays corresponding to a first central subset of a pixel element positions, including;

a means for dividing each pixel row of said first computational pixel arrays into a plurality of row segments;

a means for computing an average pixel intensity value for each of said row segments;

a means for dividing each pixel column of said computational pixel arrays into a plurality of column segments;

a means for computing an average pixel intensity value for each of said column segments;

a means for generating signals corresponding to a difference between each corresponding one of said row segments in said match and image first computational pixel arrays;

a means for generating signals corresponding to a difference between each corresponding one of said column segments in said match and image first computational pixel arrays;

a means for generating signals indicative of a sum of said column segment and said row segment differences;

a means for configuring, for said match image, a computational pixel array corresponding to a second, non-centered, subset of a pixel element positions, including;

a means for dividing each pixel row of said second computational pixel arrays into a plurality of row segments;

a means for computing an average pixel intensity value for each of said row segments;

a means for dividing each pixel column of said second computational pixel arrays into a plurality of column segments;

a means for computing an average pixel intensity value for each of said column segments;

a means for generating signals corresponding to a difference between each corresponding one of said row segments in said match and image computational pixel arrays;

a means for generating signals corresponding to a difference between each corresponding one of said column segments in said match and image second computational pixel arrays;

a means for generating signals indicative of a sum of said column segment and said row segment differences; and a means for generating signals selecting as a match the one of said match computational arrays corresponding to the lowest of said absolute value sums.

19. The system of claim 18 further comprising the steps of:

a means for generating, for each of said row segments, previous row transition signals corresponding to a difference between average intensity values for a current one of said row segments and a corresponding row segment in a previous row;

a means for generating previous row transition difference signals corresponding to a difference between each corresponding one of said previous row transition signals in said match and image first computational pixel arrays;

a means for generating, for each of said row segments, subsequent row transition signals corresponding to a difference between average intensity values for said current one of said row segments and a corresponding row segment in a subsequent column;

a means for generating subsequent row transition difference signals corresponding to a difference between each corresponding one of said subsequent row transition signals in said match and image first computational pixel arrays;

a means for generating, for each of said column segments, previous column transition signals corresponding to a difference between average intensity values for a current one of said column segments and a corresponding column segment in a previous column;

a means for generating previous column transition difference signals corresponding to a difference between each corresponding one of said previous column transition signals in said match and image first computational pixel arrays;

a means for generating, for each of said column segments, subsequent column transition signals corresponding to a difference between average intensity values for said current one of said column segments and a corresponding column segment in a subsequent column;

a means for generating subsequent row transition difference signals corresponding to a difference between each corresponding one of said subsequent row transition signals in said match and image first computational pixel arrays.

20. A system for aligning a garment segment pattern at a selected location in a marker with a low contrast geometric design in a fabric web, said system comprising a table having an upper surface for receiving said fabric web;

a moveable video sub-system including a camera having an array of pixel elements configured to receive light from a portion of the fabric web and provide electrical signal equivalents thereof; said method comprising the steps of:

a means for receiving marker signals including garment segment pattern signals and a reference signal corresponding to a reference location in said marker of said fabric design and camera pixel element alignment therewith;

a means for receiving, from said camera video sub-system signals including signals corresponding to said fabric web design at said reference location;

a means for receiving, from said camera video sub-system signals including signals corresponding to said fabric web design at a match location;

a means for generating, for said reference location and said match location signals, signals corresponding to respective low resolution images including the steps of:

a means for configuring a blurring pixel array corresponding to a subset of a plurality of pixel element positions centered about a given pixel element;

a means for assigning a weighting value for each of said pixel array subset element positions;

a means for computing, for each of said reference and match image pixel signals, a weighted pixel signal value corresponding the sum of the product of the pixel intensity value for each pixel and the corresponding weighting value divided by the number of element positions in said array subset;

a means for computing minimum and maximum signal values for said low resolution reference and match images;

a means for computing a magnitude range for said low resolution reference and match images;

a means for generating, for each of said reference and match image pixel signals, a neighbor array of signals each of whose elements correspond to the differences between a current pixel element and a plurality of adjacent pixel elements;

a means for configuring, for said low resolution reference and match neighbor signal arrays, respective computational neighbor pixel arrays corresponding to a first central subset of pixel element positions, including;

a means for generating signals corresponding to a difference between each corresponding one of said pixel elements in said match and image first computational neighbor pixel arrays;

a means for generating signals indicative of a sum of said first computational neighbor pixel element differences;

a means for configuring, for said match image, a computational neighbor pixel array corresponding to a second, non-centered, subset of said neighbor pixel element positions;

a means for generating signals corresponding to a difference between each corresponding one of said pixel elements in said match and image second computational neighbor pixel arrays;

a means for generating signals indicative of a sum of said second computational neighbor pixel element differences; and a means for generating signals selecting as a match the one of said match computational neighbor pixel arrays corresponding to the lowest of said computational neighbor pixel element sums.

* * * * *